Feb. 23, 1937.   C. F. RAUEN   2,072,059
POWER TRANSMISSION SYSTEM
Original Filed May 29, 1923   4 Sheets-Sheet 1

INVENTOR
Carl F. Rauen
BY Robert H. Young
ATTORNEY

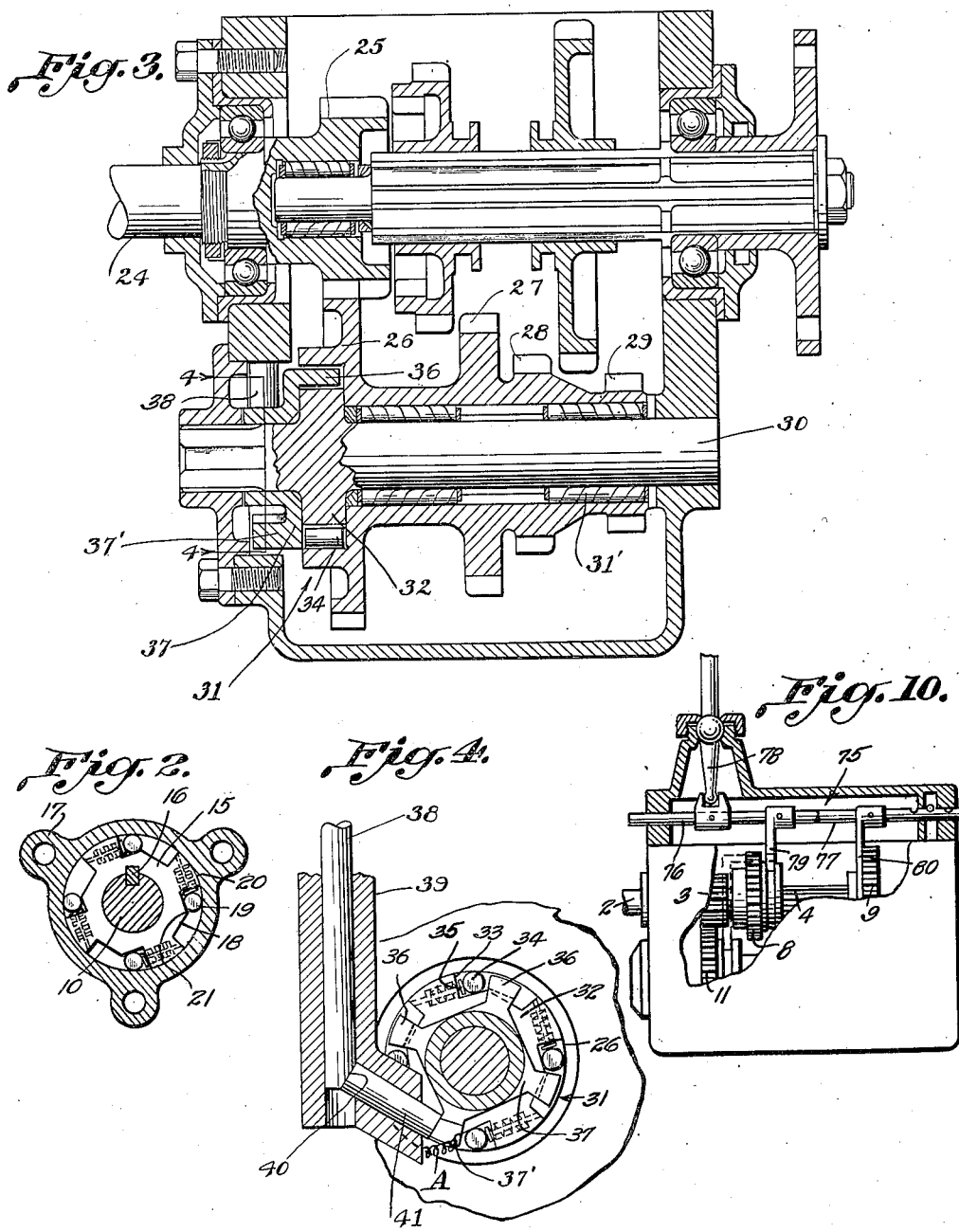

Feb. 23, 1937.  C. F. RAUEN  2,072,059
POWER TRANSMISSION SYSTEM
Original Filed May 29, 1923  4 Sheets-Sheet 3
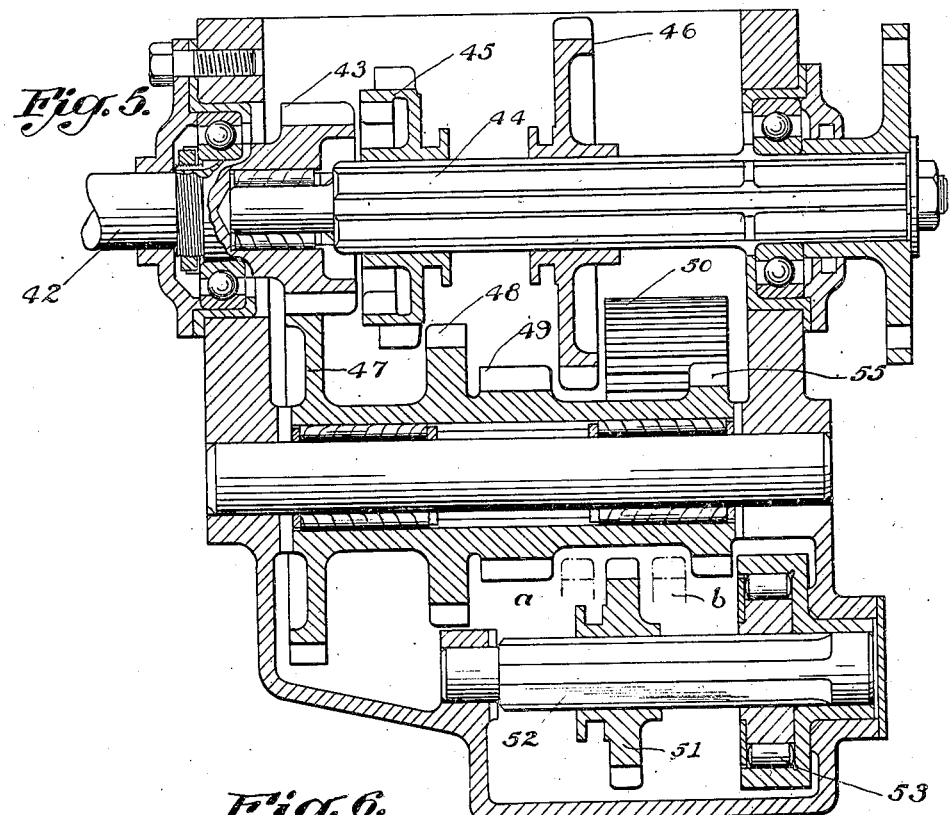
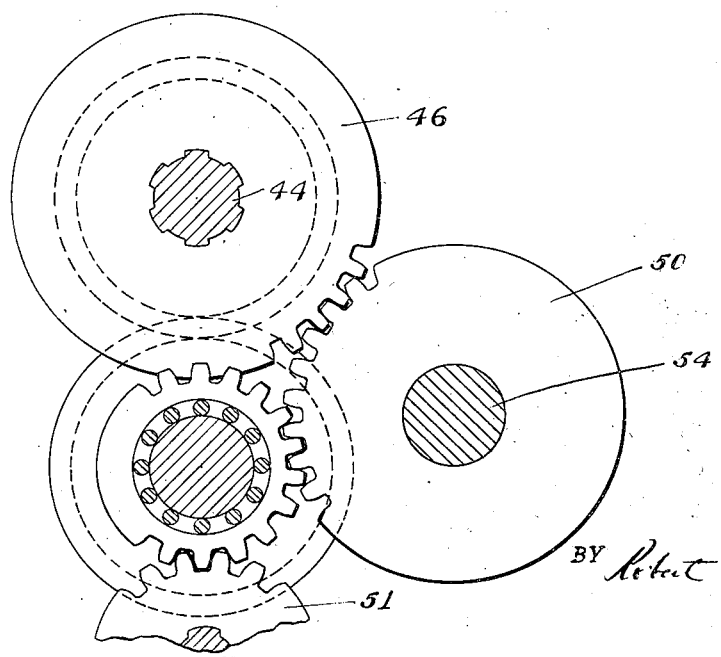
INVENTOR
CARL F. RAUEN
BY
ATTORNEY

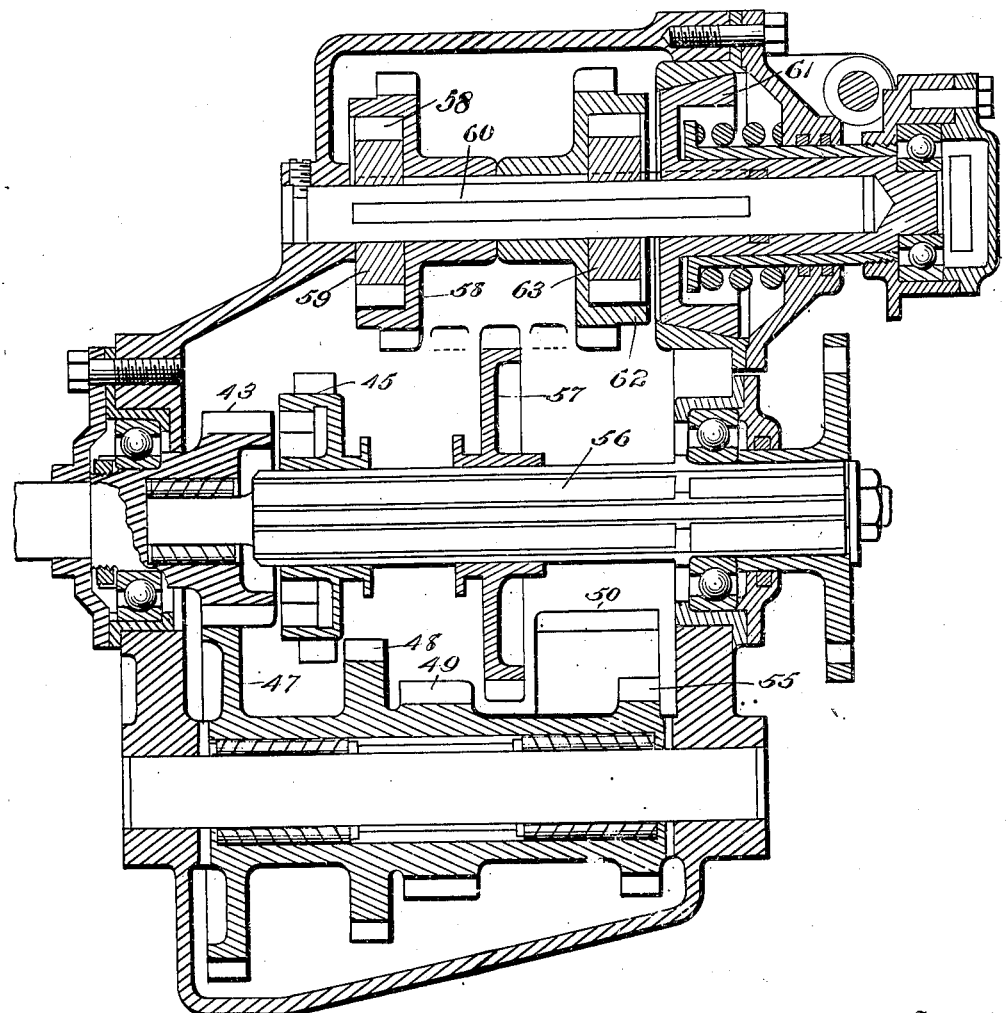

Patented Feb. 23, 1937

2,072,059

UNITED STATES PATENT OFFICE 2,072,059

POWER TRANSMISSION SYSTEM

Carl F. Rauen, Grosse Pointe, Mich.

Application May 29, 1923, Serial No. 642,301
Renewed May 8, 1935

47 Claims. (Cl. 192—4)

This invention relates to power transmission systems and is especially adaptable to motor vehicles. When adapted to motor vehicles its function is to prevent any down hill movement of the vehicle when the gears are meshed to go up the hill either backwards or forwards. This eliminates the necessity of using the foot or hand brakes to hold the car until the engine is clutched to the drive wheels, and greatly facilitates starting the car up the incline, as full engine torque may be applied to move the car without wasting any of it in overcoming the drag of the brakes until the clutch is fully engaged and they are released. If the brakes are released before the clutch is fully engaged, with the ordinary construction, the engine has to overcome the downhill movement of the car which adds a considerable load and strain on the engine and drive mechanism and often causes the engine to stall.

A further object is to provide a device to prevent backward rotation of the engine due to a back-fire, as long as the clutch is engaged, thus preventing damage or undue strain to the electrical starter, or if the engine is cranked by hand it will prevent injury to the person cranking if the engine back-fires, as a reverse motion of the engine will be immediately arrested automatically by the automatic brake. This automatic brake may take many forms but a one way roller clutch is shown as the preferred form.

Further objects will be more fully set forth in the attached description and claims.

In the drawings

Fig. 2 is a vertical section on the line 2—2 of Fig. 1.

Fig. 3 is a vertical section thru the gear box showing a modification of my invention in which the countershaft is mounted on a fixed axle and in which a release device is provided for the automatic clutch.

Fig. 4 is a vertical section on the line 4—4, Fig. 3, thru the automatic brake.

Fig. 5 is a vertical section thru the gear box showing a third modification in which the automatic brake is applied to an additional shaft which is geared to the countershaft when it is desired to connect the automatic brake for operation.

Fig. 6 is a vertical section thru Fig. 5 showing the relative arrangement of the gearing.

Fig. 7 is a view of a further modification whereby in the drive shaft is engageable with both a right hand and a left hand roller clutch.

Fig. 10 is a sectional elevational view of a form of shifter mechanism such as may be used in connection with the transmissions disclosed in the drawings.

Figure 1:
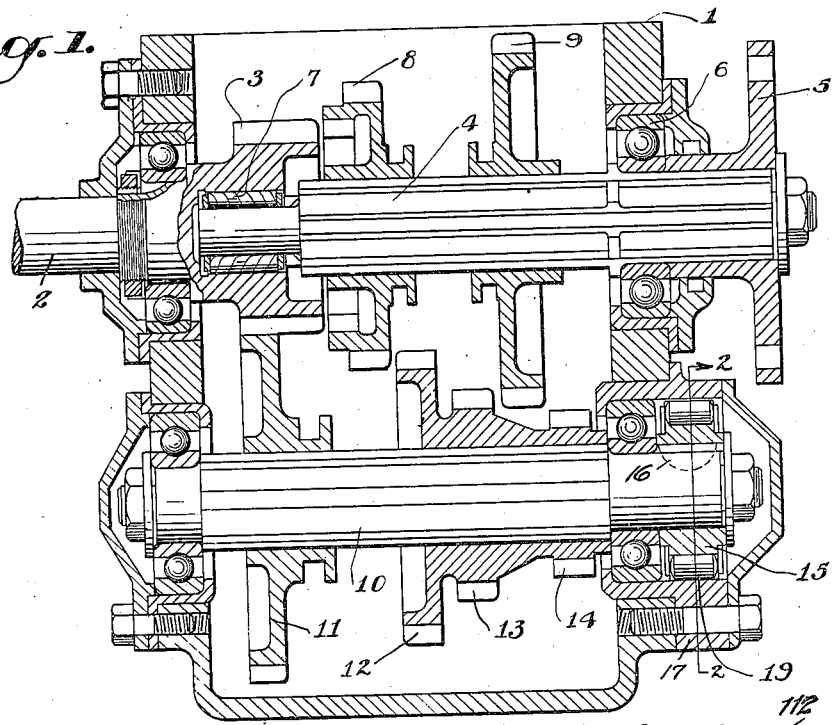
Fig. 1 is a vertical section thru a transmission gear box of an automobile showing the adaption of my invention.

Referring to the drawings by reference numerals, 1 designates generally the gear box of a multiple speed gear transmission of an automobile (Fig. 1) in which an engine driven shaft 2 is integral with the main drive gear 3, a suitable clutch (not shown) being provided between the shaft 2 and the engine in the customary manner. A driven shaft 4 is connected thru suitable splines to a flanged member 5 to which is connected the propeller shaft (not shown) and universal joint (not shown) of the automobile transmission mechanism. This shaft 4 is mounted in suitable ball bearings 6 at one end in the transmission box, and is mounted at its opposite end by means of a roller bearing 7 in the main gear 3. Splined upon the shaft 4 is a gear 8 adapted to mesh with the drive gear 3 when moved to the left, in order to directly couple the shaft 2 to the shaft 4 for high speed drive. The gear 8 may be moved to the right, in order to be disengaged from the drive gear 3 and engaged with a second speed gear 12 on a countershaft 10. A gear 9 is splined upon the shaft 4 and adapted to move to the left or to the right to mesh with a gear 13 on the countershaft for low speed or to a gear (not shown) on an idler shaft for reverse speed.

Referring to Figs. 1 and 10, the countershaft 10 is mounted in suitable ball bearings in the ends of the gear box. Splined upon this shaft 10 is a countershaft gear 11 which is movable with the gear 8 so as to be disengaged from the gear 3 when gears 3 and 8 are coupled together for direct drive and to be engaged with the gear 3 when the gear 8 is in the position shown or moved to the right so that the countershaft will be rotated when the shafts 2 and 4 are not directly coupled together. Splined upon the countershaft 10 are the gears 12, 13, and 14, gear 12 being adapted to engage with gear 8 for second speed, gear 13 engaging with gear 9 for first or low speed and gear 14 engaging with an idler gear, not shown, mounted upon an idling shaft, the idling gear engaging with gear 9 for reverse speed.

Upon the countershaft 10 is mounted a part 15 by means of a key 16 and this part 15 is adapted to freely rotate in one direction within an outer fixed member 17 suitably bolted to the gear box 1 in a stationary position. The part 15 is provided with cut-away portions 18 within each of which is a roller 19 adapted to be pressed by a spring 20 so as to be urged by this spring away from its position in the end of the cut-away portion 18 as shown in Fig. 2. The cut-away portions 18 are suitably tapered, the distance between the point 21 of each cut-away portion and the fixed outer part 17 being smaller than the diameter of the roller 19. It will be seen, therefore, that the springs 20 and the rollers 19 will prevent a counterclockwise movement of countershaft 10 as shown in Fig. 2 as they will wedge between parts 15 and 17, but will freely permit a clockwise rotation of the shaft as there is then no wedging action to lock the parts 15 and 17 together. This automatic brake device will at any time prevent reverse rotation of the countershaft 10, and if the countershaft 10 is geared by means of either of the gears 8 and 9, so that the car is in second, first or reverse speed, will prevent the car from moving in a direction opposite to which it is intended. As the countershaft can be driven in only one direction, no throw-out or release of the brake shown in Figure 1 is required when it is desired to go backward. This brake will not prevent reverse movement of the car when in high gear, since under such circumstances the countershaft 10 is not driven. However, by constructing the gear so that the clutch shaft and countershaft are always geared together, as in Figure 3, the automatic brake of Figure 1 would be operative in high gear to prevent reverse movement of the car.

Figure 8:
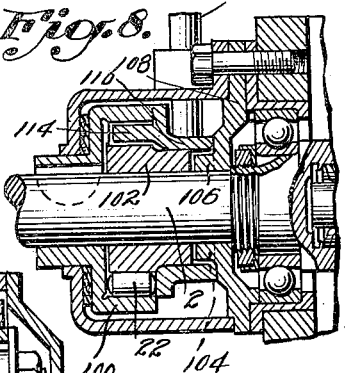
Fig. 8 shows a modified form of the construction appearing in Fig. 1.
Figure 9:
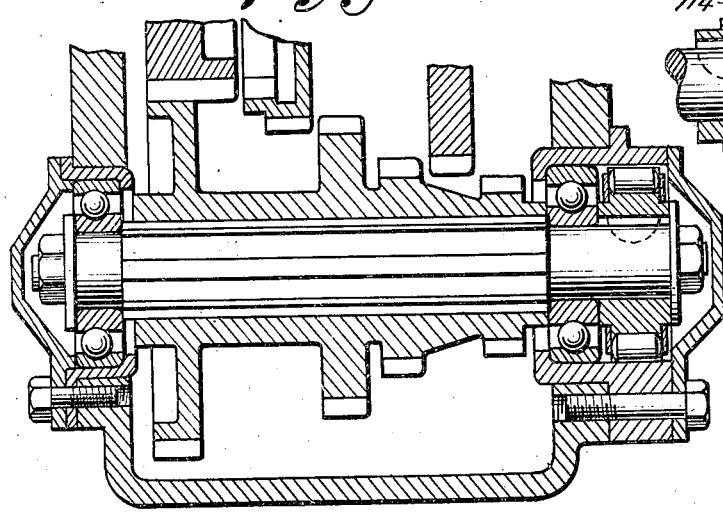
Fig. 9 shows another modification of the form of the invention appearing in Fig. 1.

It may be desirable to provide an automatic brake 22, similar to that shown in Figure 1, on the clutch shaft 2 instead of on the countershaft, as seen in Figure 8. With the automatic brake on the countershaft 10 and the gear 11 always in mesh with the gear 3 as in Fig. 9, or with the brake on the clutch shaft 2 as in Fig. 8, a backfire at the moment of cranking or starting of the motor will be immediately arrested, and the person cranking the car will be safe from injury due to the action of the crank or damage to the electric starter, if used, will be prevented.

The automatic brake 22 on the clutch shaft 2 is provided with a release device 112 corresponding to the release device 38 in Fig. 4. This device will release the rollers of the brake 22 from their wedged or locked positions and permit reverse rotation of the shaft 2, should it ever become necessary as in an emergency. The outer member 100 of the automatic brake 22 is keyed to the shaft 2 for rotation therewith, and the inner member 102 is provided with an annular series of spaced fingers 104 which are shown in dotted lines in Fig. 8 and which mate with complementary fingers 106 formed on a cap 108 which is bolted to the transmission case. The releasing member 110, which is operated by the rod 112 similar to the rods 38 and 41 illustrated in Fig. 4, is provided with a plurality of fingers 114 which extend between the locking surfaces of the automatic brake and each of which is adapted to engage a roller thereof for moving the same out of gripping engagement. The member 110 is similar to the member 37 illustrated in Fig. 4 and is rotatable relative to the member 102 on which the cam surfaces of the automatic brake are formed.

In Fig. 3 the main drive shaft 24 is integral with gear 25 which is always in mesh with a countershaft gear 26. The gear 26, second speed gear 27, low speed gear 28 and reverse speed gear 29 are made integral and are freely mounted on a fixed shaft 30 by means of roller bearings 31'. In this modification the countershaft gears all rotate at all times. When the car is in gear, whether it is first, second, third or reverse, the automatic brake 31, which is connected to the gear 26, will automatically operate to prevent undesired reverse rotation of the countershaft and will at all times be connected to the drive shaft 24 to prevent a reverse direction of rotation of the engine. The automatic brake 31 consists of the part 32 having the cut-away portions 33, rollers 34 and springs 35. Arms 36 project into these cut-away portions 33 and these arms 36 are carried by a spider 37 which is manually operated by a plunger 38 which is vertically slidable in a suitable housing 39 and which is provided with a cam face 40 co-acting with the sliding rod 41 so that when the rod 38 is pushed down, the rod 41 will be longitudinally operated to press against a lug 37' on the spider 37 and cause the arms 36 to engage the rollers 34 to release the rollers from their wedged or locked positions to permit reverse rotation of the countershaft gears. It will only be necessary to use this release in an emergency and so it is provided for this purpose. The spider 37 may be maintained in its normal position by suitable spring means A.

In Fig. 5, a main drive shaft 42 provided with a drive gear 43 is adapted to drive the splined shaft 44 on which are slidably mounted the high and second gear 45, and the low and reverse gear 46. Countershaft gears 47, 48, 49 and reverse idler 50 are adapted to engage with gears 43, 45, and 46 respectively. Operably connected with gear 46 so as to be moved at the same time is a gear 51 on a rotatable shaft 52, the rotatable shaft 52 being provided with an automatic brake 53 similar to those already described. When the gear 46 is moved to the left in Fig. 5 so as to just engage with the low speed gear 49, the gear 51 will be moved to the position indicated by the letter "a" and the gear 51 will still be out of engagement with the gear 49. As gear 46 is now in its normal low gear position, the automatic brake 53 will still be entirely disconnected from the rest of the active transmission gearing. When, however, the gear 46 is moved still further to the left, still meshing with the countershaft gear 49, the gear 51 on the automatic brake shaft will then be engaged with the gear 49 so that the automatic brake 53 will be ready at any instant to arrest a reverse motion of the countershaft. The gear 49 is made long enough so that the gear 46 will still be engaged in either of these two positions. When the gear 46 is moved to the right, to engage the reverse idler gear 50 on a reverse idling gear shaft 54, the gear 51 will be moved to the position "b". When the gear 46 is moved still further to the right the gear 51 will be moved so as to engage the countershaft reverse gear 55 so as to operably connect the automatic brake 53 with the countershaft gear. It will be seen that the countershaft gears in this construction always rotate in the same direction regardless whether the car is being driven backwards or forwards and that the automatic brake shaft 52 also rotates in the same direction. By having the sliding gears 46 and 51 operable together in the manner described from the gear shift lever, the operator may have his automatic brake connected or disconnected according to his desires, so a release would hardly be necessary in this construction as the brake is put in operation only when wanted, but it can be provided if desired.

The construction just described may be changed so as to be applied to a shaft which rotates in both directions, as for example the shaft 56 of Figure 7, by gearing this shaft, when desired, through the slide gear 57, to one member of a left hand roller clutch 58, the other member 59 being fixed to an auxiliary shaft 60 which is held engaged with the gear box by a manually releasable clutch 61 to prevent rotation in one direction, or by gearing to a corresponding member 62 of a right hand roller clutch 63 to prevent rotation in the opposite direction. These two roller clutches can be selectively engaged by the gear 57 and be arranged as shown so that low and reverse gear speeds can be obtained with or without the automatic brake becoming effective.

In Figure 10 there is disclosed one form of a conventional shifter mechanism 75 such as may be used in connection with the transmissions illustrated in the drawings. Shifter rods 76 and 77 which are adapted to be moved by a manipulative shift lever 78 are provided with forks 79 and 80, respectively, which are engageable with the slidable gears of the transmission for moving the same, to effect changes in the ratio of the drive between the driving and driven shafts provided by the transmission gearing. The fork 79 is also connected to the countershaft gear 11 which is moved thereby with gear 8.

I claim:

1. A transmission for a motor vehicle comprising, in combination, a shaft rotating in the same direction whichever direction the vehicle is driven, and means operatively connected to said shaft even though said transmission is not set for said vehicle to be motor-driven, and rendered effective upon any reverse rotative tendency of said shaft to prevent reverse rotation thereof, together with a driver-controlled device for rendering said means inoperative.

2. A transmission for a motor vehicle comprising, in combination, a shaft rotating in the same direction whichever direction the vehicle is driven, and means operatively connected to said shaft at all times and rendered effective upon a reverse rotative tendency of said shaft to prevent reverse rotation thereof, together with a driver-controlled device for readily rendering said means inoperative whether or not it is holding said shaft.

3. A transmission for a motor vehicle comprising, in combination, a shaft rotating in the same direction whichever direction the vehicle is driven, and an overrunning roller clutch for preventing reverse rotation of said shaft with substantially no lost motion, together with means for moving the rollers of the clutch to inoperative positions whether or not they are holding the shaft.

4. A vehicle transmission comprising, in combination, a driving shaft and a countershaft driven therefrom, a driven shaft selectively rotated by the driving shaft and the countershaft at different speeds and in opposite directions while the directions of rotation of the driving shaft and countershaft remain unchanged, bearings for the ends of the countershaft, and a one-way clutch device on the countershaft to prevent reverse rotation thereof and disposed exteriorly of the space between said countershaft bearings.

5. A vehicle transmission comprising, in combination, a driving shaft and a countershaft driven therefrom, a driven shaft selectively rotated by the driving shaft and the countershaft at different speeds and in opposite directions while the directions of rotation of the driving shaft and countershaft remain unchanged, and automatic means engaging said driving shaft to prevent reverse rotation thereof, together with a driver-controlled device to render said means inoperative and effective whether or not said means is holding the shaft.

6. A vehicle transmission comprising, in combination, a supporting shaft held against rotation, a change-speed gear member rotatably mounted on said shaft, and a device including spring pressed means engaging the shaft and said member and preventing rotation of said member in one direction.

7. A vehicle transmission comprising, in combination, a supporting shaft held against rotation, a change-speed gear member rotatably mounted on said shaft, and a one-way spring clutch device between the shaft and said member and preventing rotation of said member in one direction.

8. A transmission for a motor vehicle comprising, in combination, a member rotating in the same direction whichever direction the vehicle is driven, and means operatively connected to said member at all times and rendered immediately effective by a reverse rotative tendency of said member to prevent reverse rotation thereof, together with a driver-controlled device for rendering said means inoperative.

9. A transmission for a motor vehicle comprising, in combination, a member rotating in the same direction whichever direction the vehicle is driven, and means rendered effective by a reverse rotative tendency of said member to prevent reverse rotation thereof, together with a driver-controlled device for selectively rendering said means operative without changing the setting of the transmission.

10. The combination with a change speed gear housing for a power operated vehicle, of a shaft adapted to be connected to the drive wheels of the vehicle, a clutch shaft having connection with the source of power, change speed gearing between said two shafts, and means between said clutch shaft and housing to prevent backward movement of the vehicle when in forward gear.

11. A transmission mechanism for a motor vehicle including forward and reverse gearing, a safety clutch connected therewith for normally preventing movement of the vehicle for a direction contrary to the direction in which the transmission gearing is engaged for moving the vehicle, and means operative at will for disengaging said clutch mechanism to permit the free shifting of said gearing.

12. A transmission for motor vehicles comprising a transmission mechanism including forward and reverse gears, a safety clutch device connected with one of said gears and arranged to permit the free movement of said gears in a given direction, and to normally prevent the free movement thereof in an opposite direction, and means for rendering said clutch mechanism operative and inoperative at will.

13. A transmission for motor vehicles including forward and reverse gears, a safety clutch device connected with one of said gears and normally operative for permitting the rotation of said gear in a given direction, and for preventing rotation thereof in an opposite direction, and means for rendering said clutch device inoperative at will.

14. In a motor vehicle transmission having a neutral position and comprising a member movable in the same direction regardless of the direction in which the vehicle is driven, and a device including spring operated means rendered immediately effective by a reverse rotative tendency of said member to prevent retrograde movement of said vehicle, opposite to that for which said transmission is set, whether it is set for driving the vehicle backwardly or forwardly, and means controllable by the vehicle operator for rendering said device inoperative without changing the setting of the transmission to neutral.

15. In a vehicle transmission, a drive shaft, a driving gear thereon, a stationary countershaft, a countershaft gear rotatably mounted thereon and in constant mesh with said driving gear, said countershaft gear being formed with a central recess, a disc member mounted and fast directly on said countershaft within said gear recess, and a locking member interposed between said disc member and said countershaft gear, said disc member being formed with means to effect a wedging engagement between the locking member, said gear and said disc member, if the gear is turned in one direction, but permitting a free relative revoluble movement between said parts if the gear is turned in the opposite direction.

16. In a vehicle transmission, a drive shaft, a driving gear thereon, a stationary countershaft, a countershaft gear rotatably mounted thereon and in constant mesh with said driving gear, said countershaft gear being formed with a central recess, a disc member mounted fast and directly on said countershaft within said gear recess, the periphery of said disc member being formed with spaced apart tapered openings, and a roller bearing interposed between the gear and the disc member and movably mounted in the enlarged end portion of each of said recesses.

17. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, automatic restraining means for said cluster gear, and means controllable at the will of the operator to release said restraining means.

18. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, a stationary cam, clutch rollers between said cam and cluster gear, and a releasing member for said clutch rollers.

19. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, a cam fixed to said countershaft, clutch rollers between said cam and cluster gear, a releasing member for said clutch rollers, means to limit movement of said releasing member in one direction, and means under the control of the operator to move said releasing member in the opposite direction.

20. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, a cam fixed to said countershaft, clutch rollers between said cam and said cluster gear, a releasing member for said clutch rollers, a stop limiting movement of said releasing member in one direction and a tension device to move said releasing member towards said stop.

21. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, a cam fixed to said countershaft, clutch rollers between said cam and said cluster gear, a releasing member for said clutch rollers, a stop limiting movement of said releasing member in one direction, a tension device to move said releasing member towards said stop, and means to effect movement of said releasing member in the opposite direction.

22. The combination of a cluster gear, of a shaft mounted in the interior of said gear, a set of locking rollers between said shaft and cluster gear to allow a free relative movement between said shaft and cluster gear in one direction and for preventing a relative movement between said shaft and cluster gear in the opposite direction.

23. The combination of a revolvable cluster gear, of a stationary shaft mounted in the interior of said gear, locking means mounted on said shaft to allow said cluster gear to revolve freely in one direction and for preventing the revolution of said cluster gear in the opposite direction.

24. The combination of a revolvable cluster gear, of a stationary shaft mounted in said cluster gear, locking means between said shaft and cluster gear to allow a free relative movement between said shaft and cluster gear in one direction and for preventing a relative movement between said shaft and cluster gear in the opposite direction.

25. In a transmission for a motor driven vehicle having a selectively operable mechanism for motor-driving the vehicle in different directions, means to automatically prevent downhill movement of the vehicle when the mechanism is set for the motor to move the vehicle uphill either forwardly or backwardly, and a device operable for rendering said means inoperative when holding the vehicle against downhill movement to permit downhill movement of said vehicle without changing the setting of the mechanism.

26. In the transmission and drive system of a motor driven vehicle, shift means for setting said transmission for driving said vehicle in a selected direction, means to automatically prevent undesired movement of the vehicle in a direction opposite to that for which the transmission is set, whether the transmission is set to drive the vehicle backwardly or forwardly, and a manipulative device between the motor and the road wheels of the vehicle operable to relieve said means of its load when holding the vehicle on an incline to permit the setting of the transmission to be changed.

27. A transmission mechanism for a motor driven vehicle including a shaft operatively associated with the road wheels of said vehicle, shift means whereby said mechanism may be set for driving said vehicle in a selected direction, a housing for said mechanism, and an automatic device normally operable for holding said shaft to prevent movement of said vehicle in the opposite direction and arranged to be readily releasable under load, said device including a pair of relatively movable members, one of said members being rotatable with said shaft in at least one direction, and the other of said members being connected to said housing so as to take the load of said vehicle on said device, and a roller member adapted to couple said relatively movable members upon tendency of said vehicle to move in said opposite direction, one of said members being readily movable from its normal operative position when said device is under load to release the same for permitting movement of said vehicle in said opposite direction.

28. A transmission mechanism for a motor vehicle including forward and reverse gearing, control means for said gearing, a frictionally operating one-way device connected therewith for automatically preventing movement of the vehicle in a direction contrary to the direction in which the transmission gearing is engaged for moving the vehicle, whether the gearing is engaged for moving the vehicle forwardly or reversely, and means operative at will for rendering said device inoperative to permit the setting of said mechanism to be changed.

29. Transmission mechanism for a motor driven vehicle having a shaft, forward and reverse gearing for connecting said shaft to be motor-driven either forwardly or reversely, control means for said mechanism, an automatic device operable for resisting a load on said shaft tending to rotate the same in a direction opposite to that for which said mechanism is set, and means operable for releasing said load upon said device to permit the setting of said transmission mechanism to be changed.

30. A transmission mechanism for a motor-driven vehicle including a shaft operatively associated with the road wheels of said vehicle, shift means whereby said mechanism may be set for driving said vehicle in a forward or reverse direction, a device normally operable for automatically holding said shaft to prevent coasting movement of said vehicle in the reverse direction when said mechanism is set for driving said vehicle forwardly, said device including a plurality of relatively movable members, one of which is rotatable with said shaft, and a frictionally operable gripping member adapted to couple said relatively movable members to prevent relative rotation therebetween in one direction; said device being capable of being readily released when holding the shaft to prevent coasting movement of said vehicle by movement of one of said members and being arranged to be inoperable to prevent movement of said vehicle in a reverse direction when said mechanism is set for driving said vehicle reversely, and control means for said device operable for maintaining said device inoperative to prevent movement of said vehicle in a reverse direction even though the transmission setting may be changed.

31. A transmission mechanism for a motor-driven vehicle including a shaft operatively associated with the road wheels of said vehicle, shift means whereby said mechanism may be set for driving said vehicle in a forward or reverse direction, a device normally operable for automatically holding said shaft to prevent coasting movement of said vehicle in the reverse direction when said transmission is set for driving said vehicle forwardly, said device including a plurality of relatively movable members, one of which is rotatable with said shaft, and a frictionally operable gripping member adapted to couple said relatively movable members to prevent relative rotation therebetween in one direction, one of said members being readily movable to break gripping action between said members, when said device is holding said shaft to prevent coasting movement of said vehicle, for releasing said device, said device being arranged to be inoperable to prevent movement of said vehicle in a reverse direction when said mechanism is set for driving said vehicle reversely, and control means for said device operable for maintaining said device inoperable to prevent coasting movement of said vehicle in a reverse direction when the mechanism is set for driving the vehicle forwardly.

32. A transmission mechanism for a motor-driven vehicle including a shaft operatively associated with the road wheels of said vehicle, shift means whereby said mechanism may be set for driving said vehicle in a selected direction, a device normally operable for automatically holding said shaft to prevent coasting movement of said vehicle in the opposite direction, said device including a plurality of relatively movable members, one of which is rotatable with said shaft, and a frictionally operable gripping member adapted to couple said relatively movable members to prevent relative rotation therebetween in one direction, and means operable independently of operation of said shift means to prevent gripping action between said members when said device is holding said shaft.

33. A transmission mechanism for a motor-driven vehicle including shift means whereby said mechanism may be set for driving said vehicle in a selected direction, a device normally operable for automatically holding said vehicle against coasting movement in the opposite direction, said device including a plurality of relatively movable members, one of which is operatively associated with the road wheels of the vehicle, a frictionally operable gripping member adapted to couple said relatively movable members to prevent relative rotation therebetween in one direction, and a movable lug operable independently of operation of said shift means and cooperable with one of said members to control the operation of said device.

34. A transmission for a motor-driven vehicle including a shaft operatively associated with the road wheels of said vehicle, shift means whereby said transmission may be set for driving said vehicle in a selected direction, an automatic device operable for holding said shaft to prevent coasting movement of said vehicle in the opposite direction, said device including a plurality of relatively movable members having relatively inclined surfaces, one of said members being rotatable with said shaft, a locking roller adapted to be wedged between said surfaces upon tendency of said vehicle to move in said opposite direction, and means operable independently of operation of said shift means and engageable with said roller for moving the same relative to the locking surfaces of said members for rendering said device inoperative.

35. In a motor vehicle transmission, the combination of relatively movable members with a one-way roller clutch mechanism operatively associated with said members and normally and automatically operable for preventing relative movement of said members in one direction, one of said members being operatively associated with the road wheels of the vehicle and being adapted to be rotated in a selected direction, said mechanism including parts connected to each of said members provided with relatively inclined locking surfaces, rollers adapted to be wedged between said surfaces upon tendency of said members to move relative to each other in one direction for preventing relative movement in such direction for preventing relative movement of the vehicle in a direction opposite to said selected direction, and a spider having lugs projecting between said locking surfaces, said lugs being cooperable with said rollers for moving the same relative to the locking surfaces to permit relative movement of said members in said one direction.

36. In a motor vehicle transmission, a housing therefor, a fixed member connected to said housing, a movable member operatively associated with the road wheels of the vehicle, shift means operable for arranging said transmission for driving said movable member forwardly and reversely, a one-way roller clutch mechanism operatively associated with said members and normally and automatically operable for preventing movement of said movable member in one direction with respect to said fixed member, said clutch mechanism including parts connected to each of said members respectively and provided with relatively inclined surfaces and rollers adapted to be wedged between said surfaces upon tendency of said movable member to move in said one direction, and means associated with said rollers operable for moving the same relative to said inclined surfaces to permit movement of said movable member in said one direction when said transmission is arranged for driving said movable member reversely.

37. In a motor vehicle transmission having a shaft operatively associated with the road wheels of the vehicle and adapted to be driven in a selected direction, a device operable to exert a force to resist rotation of the shaft in the opposite direction, and cam means operable to overcome said force so as to allow rotation of said shaft in said opposite direction.

38. A transmission mechanism for a motor driven vehicle including a shaft operatively associated with the road wheels of said vehicle, shift means whereby said mechanism may be set for driving said vehicle in a forward or reverse direction, a device normally operable for automatically holding said shaft to prevent coasting movement of said vehicle in the reverse direction when said mechanism is set for driving said vehicle forwardly, said device being capable of being readily released when holding the shaft to prevent coasting movement of said vehicle and being arranged to be inoperable to prevent movement of said vehicle in a reverse direction when said mechanism is set for driving said vehicle reversely, and control means for said device operable for maintaining said device inoperative to prevent coasting movement of said vehicle in the reverse direction even though the transmission setting may be changed.

39. The combination with a motor vehicle transmission including gearing and a unidirectional shaft, a device co-operable therewith for automatically preventing movement of the vehicle in a direction contrary to the direction in which the transmission gearing is engaged for moving the vehicle, whether the gearing is engaged for moving the vehicle forwardly or reversely, and means for controlling the operation of the device when said transmission is in gear.

40. A transmission mechanism for a motor driven vehicle including a shaft operatively associated with the road wheels of said vehicle, shift means whereby said mechanism may be set for driving said vehicle forwardly or reversely, an automatic friction device normally operable for holding said shaft to prevent movement of said vehicle in a reverse direction when said mechanism is set for driving said vehicle forwardly, said device being arranged to be inoperable to prevent movement of said vehicle in a reverse direction when said mechanism is set for driving said vehicle reversely, and control means for said device operable for maintaining said device inoperative even though the mechanism setting may be changed.

41. The combination with a motor vehicle transmission mechanism, of a shaft operatively associated with the road wheels of said vehicle, shift means whereby said mechanism may be set for driving said vehicle forwardly or reversely, an automatic device normally operable for holding said shaft to prevent movement of said vehicle in a reverse direction when said mechanism is set for driving said vehicle forwardly, said device being connected to the transmission mechanism so as to be automatically rendered inoperable to prevent movement of said vehicle in a reverse direction when said mechanism is set for driving said vehicle reversely, and means for controlling the operation of said device when said mechanism is set for driving said vehicle.

42. In a motor vehicle transmission, a shaft, gearing for driving said shaft in a selected direction, means for automatically preventing rotation of said shaft in the opposite direction, said means being connected to the transmission so as to be automatically rendered inoperative to prevent rotation of said shaft in the opposite direction when said gearing is set for driving said shaft in said opposite direction, said means being arranged so that said gearing may be arranged for driving said shaft in said selected direction with and without said means being effective.

43. In a motor vehicle transmission, a shaft, gearing for driving said shaft in a selected direction, friction means for automatically preventing rotation of said shaft in one direction when the transmission gearing is set in a selected position, said means being connected to the transmission so as to be automatically rendered inoperative to prevent rotation of said shaft in said one direction when the transmission gearing is set for driving said shaft in said one direction, said means being arranged so that said transmission can be in such position with and without said means being effective.

44. Transmission mechanism for a motor driven vehicle including a shaft operatively associated with the road wheels of said vehicle, shift means whereby said mechanism may be set for driving said vehicle forwardly or reversely, an automatic device normally operable for holding said shaft to prevent movement of said vehicle in a reverse direction when said mechanism is set for driving said vehicle forwardly, said device being arranged to be inoperable to prevent movement of said vehicle in a reverse direction when said mechanism is set for driving said vehicle reversely, and control means for said device operable for maintaining said device inoperable to prevent movement of said vehicle in a reverse direction when said mechanism setting is changed to drive said vehicle forwardly.

45. In a motor vehicle transmission having shift means whereby it may be set for driving the vehicle in forward and reverse gears, a shaft operatively associated with the road wheels of the vehicle, automatic means normally preventing rotation of said shaft in one direction, said means being arranged to be inoperable to prevent reverse rotation of said shaft when the transmission is set for reverse gear, and a device operable for rendering and maintaining said means inoperative to prevent rotation of said shaft in said one direction even though said transmission setting may be changed to a forward gear.

46. In a motor vehicle transmission having shift means whereby it may be set for driving the vehicle in reverse gear, a shaft operatively associated with the road wheels of the vehicle, automatic friction means for preventing rotation of said shaft in one direction, said means being arranged to be inoperable to prevent reverse rotation of said shaft when the transmission is set for reverse gear, and a device operable for rendering and maintaining said means inoperative to prevent rotation of said shaft in said one direction even though the transmission setting may be changed.

47. In a motor vehicle transmission, a shaft operatively associated with the road wheels of the vehicle, shift means whereby said transmission may be set for driving said vehicle forwardly or reversely, automatic means operatively associated with said shaft and operable for preventing reverse movement of said vehicle when said shift means is set for driving said vehicle forwardly, said automatic means being inoperative to prevent reverse movement of said vehicle when said shift means is set for driving said vehicle reversely, and means operable independently of operation of the shift means for rendering said automatic means inoperable.

CARL F. RAUEN.